A. MOELLER.

HOLDER FOR PERSONAL TREATMENT PREPARATIONS.

APPLICATION FILED JAN. 11, 1919.

Reissued Mar. 25, 1919.

14,619.

Inventor
Annetta Moeller.

By E. W. Bradford

Attorney

THE NORRIS PETERS CO., PHOTO-LITHO., WASHINGTON, D. C.

UNITED STATES PATENT OFFICE.

ANNETTA MOELLER, OF INDIANAPOLIS, INDIANA.

HOLDER FOR PERSONAL-TREATMENT PREPARATIONS.

14,619. Specification of Reissued Letters Patent. Reissued Mar. 25, 1919.

Original No. 1,262,542, dated April 9, 1918, Serial No. 203,193, filed November 21, 1917. Application for reissue filed January 11, 1919. Serial No. 270,761.

*To all whom it may concern:*

Be it known that I, ANNETTA MOELLER, a citizen of the United States, residing at Indianapolis, Marion county, and State of Indiana, have invented and discovered certain new and useful Improvements in Holders for Personal-Treatment Preparations, of which the following is a specification.

My invention relates to holders for preparations such as used by manicurists, chiropodists, dentists, etc., who in their practice are using a number of preparations successively, all of which it is desirable to have in convenient form and arrangement for use and so as to be readily protected and kept in sanitary condition and its object is to provide an article of this class having means for holding in separate compartments the different antiseptics, powders, pastes, and other preparations, and having a movable cover or covers for said receptacles, and of such construction that the receptacles may be uncovered and covered conveniently; and to provide means for containing and feeding a body of cotton, which means may if desired be utilized as a pivot and retaining member for the cover, and serve to prevent danger of the cover from being displaced and broken.

With these objects in view, my invention is embodied in preferable form in the construction and arrangement hereinafter described and illustrated in the accompanying drawings.

Figure 1:
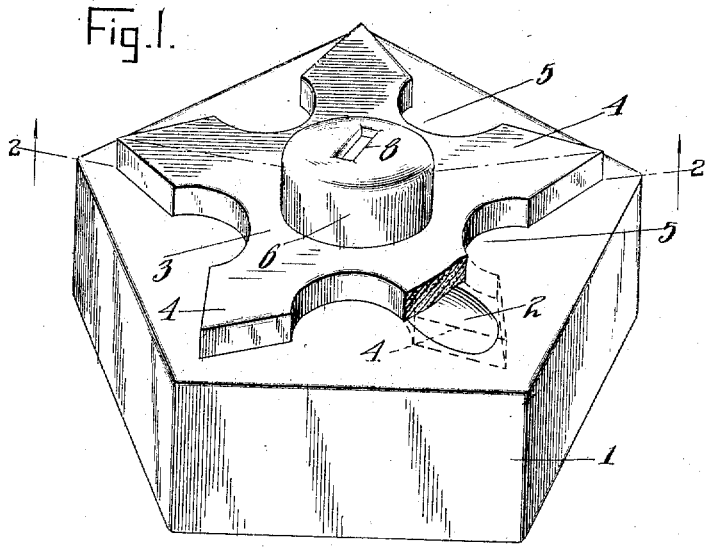
Figure 2:
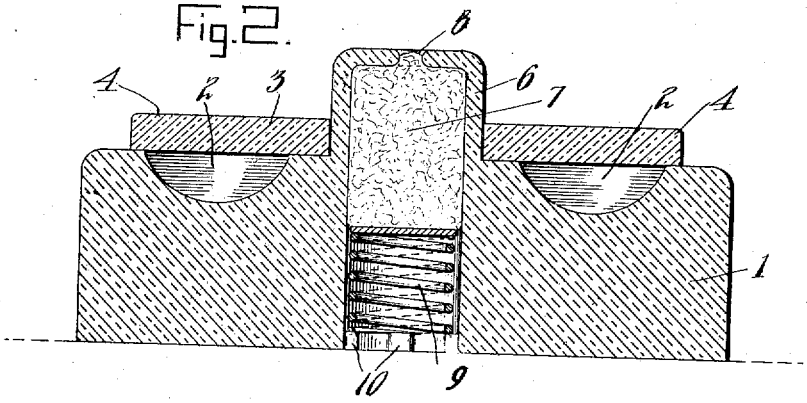

In these drawings, Figure 1 is a perspective view and Fig. 2 a vertical section on dotted line 2—2 in Fig. 1.

Referring to the drawings, 1 indicates the base of the article which is preferably made of a substantially solid body of glass, although such material is not essential to the purpose of my invention, and which is adapted to rest upon the table, chair rest or other suitable support. This body is preferably polygonal in form with a series of flat vertical faces in order to enable it to be accommodated to the sides of a chair seat and be firmly retained in position. Formed in the upper surface of this solid body are wells or recesses 2, adapted to receive powders, pastes, liquids or other materials employed in the manicuring or other operation and into which the instruments of the user are adapted to be dipped. Mounted on the upper surface of the body is a rotatable cover 3, which is provided with radially extending closure wings or sections 4, adapted to register with and cover the wells 2, and with recesses 5, between said sections adapted to permit the wells to be uncovered when it is desired to use the preparations contained therein. Modifications in such form will readily suggest themselves to the manufacturer to best adapt the device for the different uses.

In the drawings five of the wells are shown but a greater or less number may be employed if desired. The recesses 5 and closing sections 4 may correspond in number to the wells so that when the cover when of the form shown is turned to open position all of the wells will be uncovered at the same time, which is a feature of advantage in use for some purposes owing to the fact that it is oftentimes desirable to use all the materials contained in the various receptacles. Other forms may be found desirable for other uses.

As shown the cover is provided with a central opening therethrough, engaging a central post 6 rising from the body and preferably integral therewith, and this post serves as a pivot for the cover and as means for retaining the same against lateral displacement, whereby the cover is protected from being dislodged from the body with the consequent danger of breaking the same. This post or boss is hollow and forms a continuation of a central hollow circular bore in the body 1 of the article and in the chamber thus provided there is mounted a body of raw cotton 7, which is adapted to be drawn out through a slot 8 formed in the upper end of the boss or post. This body of cotton is supported and forced upward by means of a spring 9, the lower end of which rests upon inward lugs 10 on the inner edge of the body 1.

In the use of the device when it is desired to apply the materials in the wells, the cover is moved so as to uncover the receptacles and the instruments dipped therein, and during the operation the cotton may be readily pulled out through the opening in the central post. When the operation is completed the cover is moved so as to close the wells, whereby the contents of the same are protected from dust and evaporation. A sanitary holder is thus provided. In the use of the article it is frequently necessary to move the same from place to place and particularly to support the same upon a rest chair. The liability of the accidental dislodgment and injury to the cover is obviated by the engagement of the cover with the central retaining post which prevents lateral displacement thereof.

Having thus described my invention, what I claim is:

1. A holder for manicuring preparations having a base body adapted to be supported directly upon a suitable plane surface and provided in its upper surface with a plurality of open receptacles for manicuring compositions, and a rotatable cover mounted on the upper face of said body and provided with a plurality of openings corresponding to said recesses and with a plurality of cover sections corresponding thereto whereby in the rotation of said cover said receptacles may be simultaneously opened or closed, and a central hollow post rising from the base body above the surface thereof said cover being centrally apertured to engage said post whereby the cover is retained against lateral displacement and said post being provided with an opening in its upper end from which cotton stored in the post may be withdrawn.

2. A holder for manicuring preparations having a base body of substantial thickness and adapted to rest upon a suitable support and provided in the upper surface thereof with a plurality of open receptacles for manicuring compositions, a rotatable cover having openings and closure sections corresponding to said receptacles and arranged alternately around the circumference thereof said cover being centrally apertured, and a hollow post rising above the surface of the body and constituting a pivotal and retaining member for the cover and engaged by the central aperture thereof said base body being polygonal in form and having flat vertical plane faces whereby the base may be fitted against flat surfaces and prevented from movement thereby.

3. A holder for several distinct preparations for use in personal treatments comprising a body member provided with a series of normally open receptacles in its upper surface, movable cover parts for said receptacles mounted on the upper face of the body, and a central hollow post projecting from said body member above its face and having an opening in its top through which its contents may be taken for use, substantially as set forth.

4. A holder for preparations having a body provided with receptacles, and a central hollow post projecting above the surface, an apertured cover for said receptacles mounted to rest on said surface and pivot on said post, said body having a hollow chamber communicating with said post and adapted to receive cotton, and said post having an opening in its top through which the cotton therein may be pulled as used, substantially as set forth.

In witness whereof, I have hereunto set my hand and seal at Indianapolis, Indiana, this 7th day of January, A. D. nineteen hundred and nineteen.

ANNETTA MOELLER. [L. S.]

Copies of this patent may be obtained for five cents each, by addressing the "Commissioner of Patents, Washington, D. C."